US010435094B2

(12) United States Patent
Kawasaki et al.

(10) Patent No.: US 10,435,094 B2
(45) Date of Patent: Oct. 8, 2019

(54) METHOD OF PRODUCING VEHICLE BODY ASSEMBLY (71) Applicant: HONDA MOTOR CO., LTD, Minato-ku, Tokyo (JP)

(72) Inventors: Nobuya Kawasaki, Tochigi-ken (JP); Hisashi Ishitsuka, Tochigi-ken (JP); Shinji Komiya, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 122 days.

(21) Appl. No.: 15/715,291

(22) Filed: Sep. 26, 2017

(65) Prior Publication Data
US 2018/0086403 A1 Mar. 29, 2018

(30) Foreign Application Priority Data

Sep. 29, 2016 (JP) ................... 2016-191768

(51) Int. Cl.
B62D 65/02 (2006.01)
B25J 9/00 (2006.01)
(Continued)

(52) U.S. Cl.
CPC .......... *B62D 65/026* (2013.01); *B23K 37/047* (2013.01); *B23K 37/0443* (2013.01); *B23P 19/10* (2013.01); *B25J 9/0096* (2013.01); *B25J 11/005* (2013.01); *B62D 65/02* (2013.01); *B62D 65/022* (2013.01); *B62D 65/024* (2013.01); *B23K 2101/006* (2018.08);
(Continued)

(58) Field of Classification Search
CPC .. B62D 65/026; B62D 65/024; B62D 65/022; B62D 65/02; B62D 25/2009; B62D 25/2027; B23K 37/047; B23K 37/0443; B23K 2101/006; B23P 19/10; Y10T 29/49895; Y10T 29/49904; Y10T 29/49902; Y10T 29/49899; B25J 9/0096; B25J 11/007; B25J 11/005
See application file for complete search history.

(56) References Cited

U.S. PATENT DOCUMENTS

2013/0091699 A1* 4/2013 Kim ................. B25J 9/0084
29/822
2017/0029053 A1 2/2017 Ishitsuka et al.

FOREIGN PATENT DOCUMENTS

JP       2013-159125      8/2013
WO      2015156354       10/2015
WO   WO-2015156354 A1 * 10/2015 ........... B62D 65/022

OTHER PUBLICATIONS

Chinese Office Action and Search Report for Chinese Patent Application No. 201710889290.3 dated Feb. 1, 2019.

* cited by examiner

Primary Examiner — Jermie E Cozart
(74) Attorney, Agent, or Firm — Amin, Turocy & Watson LLP (57) ABSTRACT A vehicle body assembling apparatus includes a lower jig, an upper jig movable by an arm of a robot, and a joining device. The joining device performs joining operations for lower component parts (e.g., a temporary assembly of a rear floor frame) transported by the upper jig and positioned by the lower jig, upper component parts (e.g., a temporary assembly of a rear floor panel) held by the upper jig, and a temporary assembly of a vertical assembly (e.g., rear floor component) formed by overlapping the upper assembly with the lower assembly, above the lower jig at different timings.

5 Claims, 6 Drawing Sheets (51) Int. Cl.
  *B25J 11/00* (2006.01)
  *B23P 19/10* (2006.01)
  *B23K 37/04* (2006.01)
  *B23K 37/047* (2006.01)
  *B23K 101/00* (2006.01)
  *B62D 25/20* (2006.01)
(52) U.S. Cl.
  CPC ......... *B25J 11/007* (2013.01); *B62D 25/2009* (2013.01); *B62D 25/2027* (2013.01); *Y10T 29/49895* (2015.01); *Y10T 29/49899* (2015.01); *Y10T 29/49902* (2015.01); *Y10T 29/49904* (2015.01)

METHOD OF PRODUCING VEHICLE BODY ASSEMBLY

CROSS-REFERENCE TO RELATED APPLICATION

This application is based upon and claims the benefit of priority from Japanese Patent Application No. 2016-191768 filed on Sep. 29, 2016, the contents of which are incorporated herein by reference.

BACKGROUND OF THE INVENTION

Field of the Invention:

The present invention relates to a method of and an apparatus for producing a vehicle body assembly made up of a vertical assembly formed by overlapping, and joining a lower assembly and an upper assembly together.

Description of the Related Art:

For example, a floor component of a vehicle body is a vertical assembly formed by overlapping a lower assembly and an upper assembly together. The lower assembly includes two or more component parts, and likewise, the upper assembly includes two or more component parts. The lower assembly and the upper assembly are welded together by a welding device.

International Publication No. WO 2015/156354 discloses a vehicle body assembling apparatus for obtaining a floor component from a lower assembly and an upper assembly. The vehicle body assembling apparatus includes a lower jig provided upright on a floor of a work station for positioning the lower assembly, and an upper jig for overlapping the upper assembly with the lower assembly. The upper jig is coupled to a robot arm. The robot arm is operated for allowing the upper jig to move the upper assembly.

SUMMARY OF THE INVENTION

A main object of the present invention is to provide a method of producing a vehicle body assembly which makes it possible to produce a vertical assembly as a component part of a vehicle body efficiently.

Another object of the present invention is to provide a vehicle body assembly production apparatus which achieves space saving and reduction in the capital investment.

According to an embodiment of the present invention, a method of producing a vehicle body assembly for assembling a vertical assembly as a component part of a vehicle body is provided. The method is performed by overlapping an upper assembly formed by joining two or more upper component parts together, above a lower assembly formed by joining two or more lower component parts together, and joining the upper assembly and the lower assembly together.

The method includes the steps of positioning the lower component parts by operating an arm of a robot to move an upper jig supported by the arm so as to transfer the two or more lower component parts held by the upper jig to a lower jig and positioning the lower component parts by the lower jig, performing lower joining operation by joining the lower component parts positioned by the lower jig, using a joining device to form the lower assembly, performing upper joining operation by joining the upper component parts positioned by the upper jig, using the joining device to form the upper assembly, above the lower component parts or the lower assembly positioned by the lower jig, performing vertical positioning operation by operating the arm to move the upper jig so as to overlap the upper assembly above the lower assembly, and position the upper assembly relative to the lower assembly, and performing vertical joining operation by joining the lower assembly and the upper assembly together using the joining device to form the vertical assembly.

Further, according to another embodiment of the present invention, a vehicle body assembling apparatus is provided. The vehicle body assembling apparatus assembles a vertical assembly as a component part of a vehicle body, by overlapping an upper assembly formed by joining two or more upper component parts together, above a lower assembly formed by joining two or more lower component parts together, and joining the upper assembly and the lower assembly together.

The vehicle body assembling apparatus includes a lower jig configured to position the two or more lower component parts, an upper jig configured to hold and transfer the two or more lower component parts to the lower jig, position the upper component parts above the lower component parts positioned by the lower jig, and overlap the upper component parts above the lower component parts, a robot having an arm configured to movably support the upper jig, and a joining device configured to join the lower component parts positioned by the lower jig, the upper component parts positioned by the upper jig above the lower assembly, and the lower assembly and the upper assembly overlapped with the lower assembly.

That is, in the present invention, joining operation for the lower component parts and the vertical assembly is performed on the same lower jig, i.e., at the same position. Further, joining operation for the upper component part is performed above the lower component parts or the lower assembly positioned by the lower jig. Therefore, no dedicated space is required for performing joining operation to produce each of the lower assembly, the upper assembly, and the vertical assembly individually. Thus, the size of the vehicle body assembling apparatus is reduced, and it is possible to achieve space saving of the vehicle body assembling apparatus.

Further, welding operations for the lower component parts, the upper component parts, and the overlapped lower and upper assemblies are performed at different timings. Therefore, it is sufficient to use only one joining device to obtain the upper assembly, the lower assembly, and the vertical assembly. That is, it is sufficient to use only one joining device. That is, there is no need to use more than one joining device. This point contributes to space saving of the vehicle body assembling apparatus as well. Additionally, since the number of joining devices is reduced, it is possible to achieve reduction in the capital investment.

Further, as described above, the upper component parts are welded above the lower component parts or the lower assembly positioned at the lower jig. Therefore, after the upper assembly is obtained by joining, it is possible to immediately overlap the obtained upper assembly with the lower assembly, and immediately weld the vertical assembly which has been assembled temporarily by overlapping the upper assembly with the lower assembly. Therefore, it is possible to produce the vertical assembly efficiently.

Preferably, the lower jig includes a lower engagement section, and the upper jig includes an upper engagement section configured to engage with the lower engagement section and a lower component part positioning section configured to position a portion of the lower component parts. In this case, at the time of joining the lower component parts, it is preferable that the lower component parts are positioned by the lower component part positioning section, and that the lower engagement section and the upper engagement section are brought into engagement with each other.

Since the lower engagement section and the upper engagement section are engaged with each other, the lower jig and the upper jig are coupled together. As a result of this coupling, relative displacement between the relative positions of the lower jig and the upper jig does not occur easily. That is, the relative positions between the lower jig and the upper jig can be maintained accurately.

Further, since portions of the lower component parts are positioned by the upper jig, it is sufficient for the lower jig to position the remaining portions of the lower component parts. Therefore, it is possible to simplify the lower jig. Further, by adopting the portions positioned by the lower jig to have substantially the same structure regardless of the vehicle model, improvement in the versatility of the lower jig is achieved.

Preferably, also at the time of joining the overlapped lower assembly and upper assembly together, i.e., at the time of joining the component parts of the temporarily assembled vertical assembly, the lower engagement section and the upper engagement section are brought into engagement with each other. In this manner, it is possible to assemble the vertical assembly accurately.

The obtained vertical assembly is transported to outside by the upper jig. In this case, there is no need to additionally provide a jig or a mechanism for transporting the vertical assembly to the outside. Therefore, the size reduction, and space saving of the vehicle body assembling apparatus are achieved easily to a greater extent.

For example, a rear floor frame, a rear floor panel, and a rear floor component are the lower assembly, the upper assembly, and the vertical assembly, respectively.

In the present invention, the lower component parts and the overlapped lower assembly and the upper assembly are joined together at the same position. Further, the upper component parts are joined above the lower component parts or the lower assembly positioned by the lower jig. In this manner, no dedicated space is required for performing joining operation to obtain each of the lower assembly, the upper assembly, and the vertical assembly individually. Therefore, it is possible to achieve space saving of the vehicle body assembling apparatus.

Further, since joining operations for the lower component parts, the upper component parts, and the overlapped lower assembly and upper assembly are performed at different timings, one joining device can be used sufficiently to perform the joining operations. That is, there is no need to provide two or more joining devices. For this reason as well, it is possible to achieve space saving of the vehicle body assembling apparatus to a greater extent. Further, it is possible to reduce the number of joining devices. Therefore, it is possible to achieve reduction in the capital investment.

Further, the upper component parts are welded above the lower component parts or the lower assembly positioned at the lower jig. Therefore, it becomes possible to immediately overlap the joined upper assembly with the lower assembly, and immediately weld the vertical assembly which has been temporarily assembled by overlapping. In this manner, it is possible to produce the vertical assembly efficiently.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of a method of producing a vehicle body assembly according to the present invention will be described in detail in relation to a vehicle body assembling apparatus for carrying out the method with reference to the drawings. In the embodiment of the present invention, a case of obtaining a rear floor component which is a component part of a vehicle body, as a vertical assembly, will be described with reference to the drawings.

Firstly, a rear floor component 10 shown in FIG. 1 will be described. The rear floor component 10 is formed by joining a rear floor panel 14 as an upper assembly to a rear floor frame 12 as a lower assembly. The rear floor frame 12 is curved in a circular arc shape. As shown in FIG. 2, the rear floor frame 12 includes a first side member 16 and a second side member 18 which are substantially in parallel to face each other.

Further, a first cross member 20 and a second cross member 22 are bridged between the first side member 16 and the second side member 18. The first cross member 20 is provided adjacent to ends of the first side member 16 and the second side member 18, and joined to side surfaces of the first side member 16 and the second side member 18. The second cross member 22 is provided at substantially intermediate positions of respective side surfaces of the first side member 16 and the second side member 18 in a longitudinal direction (traveling direction of the vehicle body). That is, the rear floor frame 12 mainly includes four lower component parts.

Through holes each having a relatively small diameter pass through the first side member 16, the second side member 18, the first cross member 20, and the second cross member 22 in the thickness direction (vertical direction). Hereinafter, for ease of explanation, through holes formed adjacent to a first opening 24 (described later) of the first side member 16 and the second side member 18 will be referred to as first through holes 26, through holes formed adjacent to a second opening 28 (described later) will be referred to as second through holes 30, through holes formed in the first cross member 20 will be referred to as third through holes 32, and through holes formed in the second cross member 22 will be referred to as fourth through holes 34 to distinguish these through holes 26, 30, 32, 34 from one another.

In the rear floor frame 12 having the above structure, the first opening 24 is formed at a position surrounded by the first side member 16, the second side member 18, the first cross member 20, and the second cross member 22, and the second opening 28 is formed by one end of the first side member 16, one end of the second side member 18, and the second cross member 22 to have a relatively large size.

Figure 1:
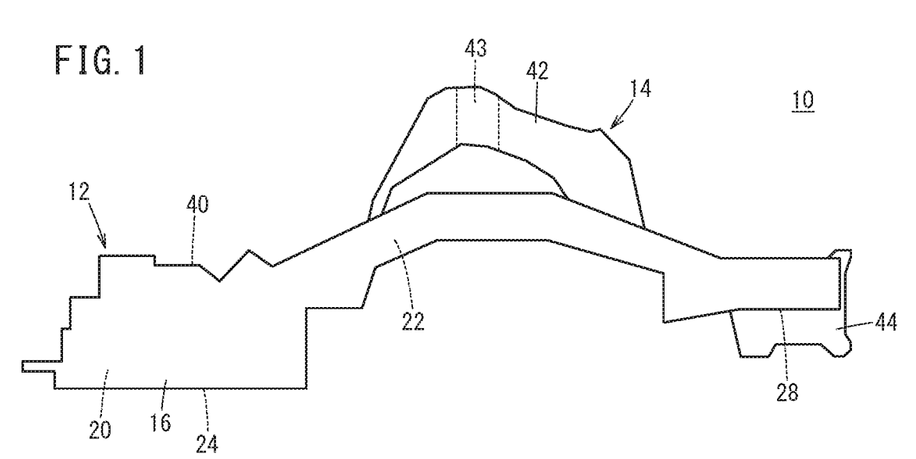
FIG. 1 is a side view schematically showing a rear floor component as a vertical assembly which is a component part of a vehicle body.
Figure 2:
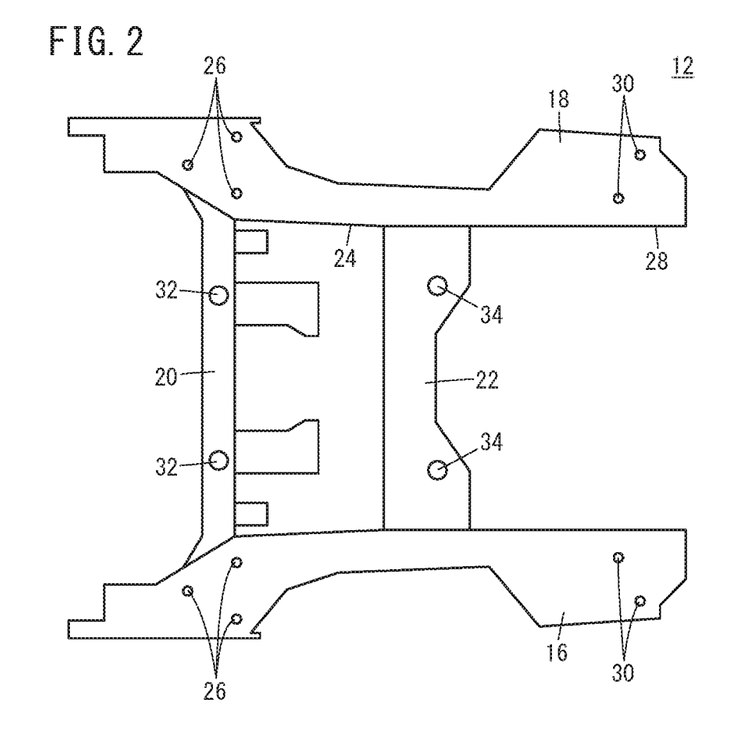
FIG. 2 is a plan view schematically showing a rear floor frame (lower assembly) of the rear floor component in FIG. 1.
Figure 5:
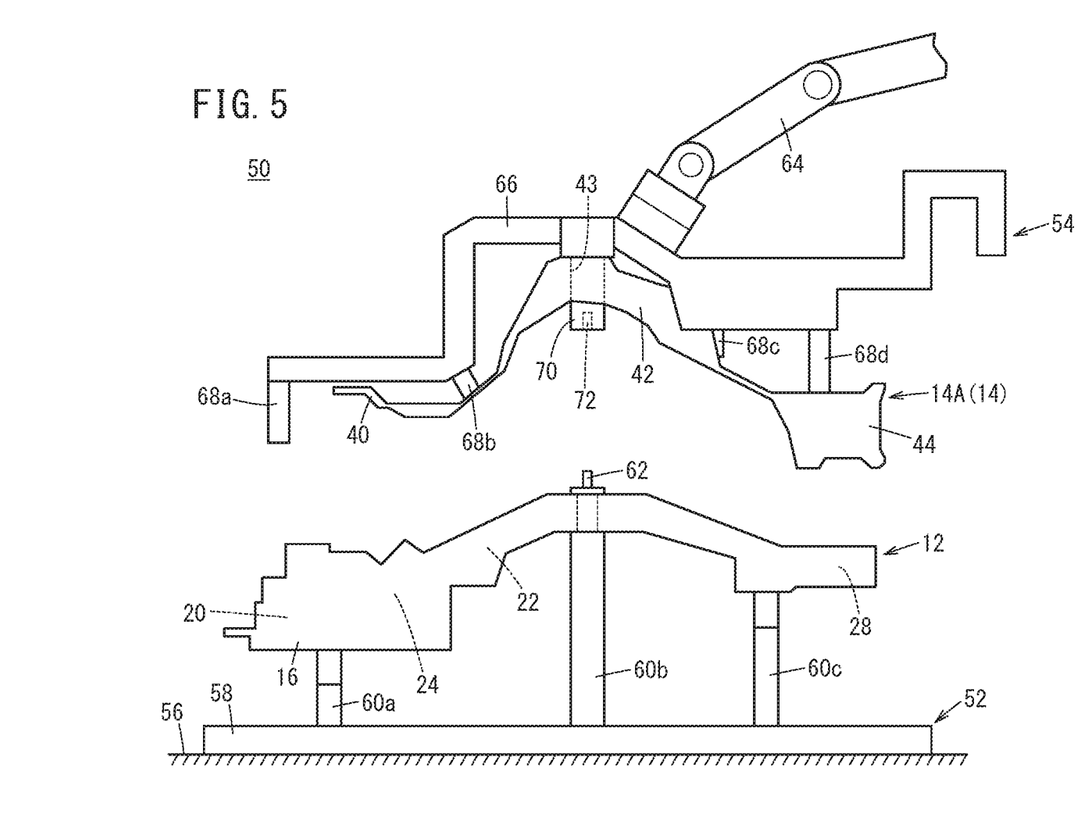
FIG. 5 is a side view schematically showing main components in a state where the rear floor panel is held by the upper jig above the rear floor frame positioned by the lower jig.

As shown in FIGS. 1 and 5, the rear floor panel 14 includes a first cover 40 for covering the first opening 24, a curved section 42, and a second cover 44 for covering the second opening 28. The curved section 42 has a large radius of curvature in comparison with the first side member 16 and the second side member 18 of the rear floor frame 12. That is, the rear floor panel 14 is mainly made up of three upper component parts. A large through hole 43 having a relatively large diameter is formed in the curved section 42, and a plurality of small through holes (not shown) each having a relatively small diameter are formed in the first cover 40 and the second cover 44, respectively.

Figure 3:
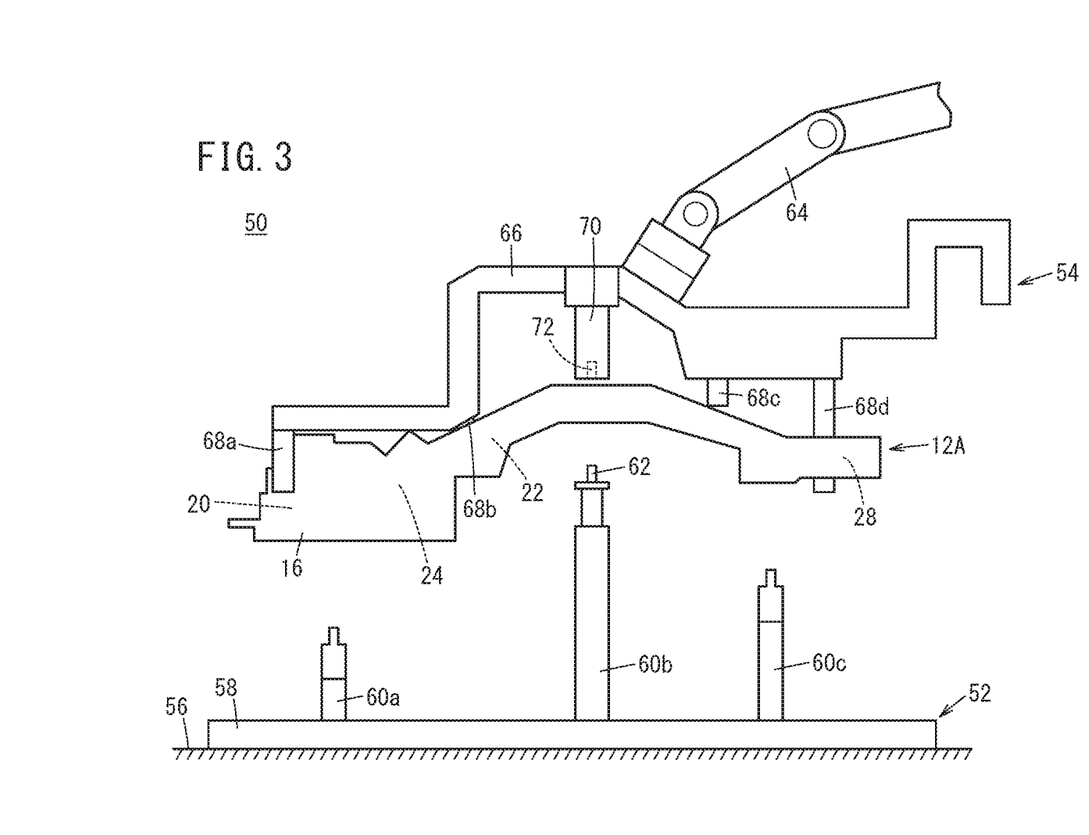
FIG. 3 is a side view schematically showing main components in a state where the rear floor frame is held by an upper jig of a vehicle body assembling apparatus according to an embodiment of the present invention.

Next, a vehicle body assembling apparatus 50 will be described. As shown in FIG. 3, the vehicle body assembling apparatus 50 includes a lower jig 52 and an upper jig 54. The lower jig 52 includes a base frame 58 placed on a floor 56 of a working station, and a plurality of positioning columns provided upright on the base frame 58. In FIG. 3, among these positioning columns, three positioning columns 60a to 60c are shown. Among the three, the positioning column 60b is the highest, the positioning column 60c is the second highest, and the positioning column 60a is the lowest.

The front end of the positioning column 60a is inserted into the first through hole 26. Further, the front end of the positioning column 60b is inserted into the fourth through hole 34, and the front end of the positioning column 60c is inserted into the second through hole 30. In this regard, a lower engagement section 62 is provided at the forefront end of the highest positioning column 60b. The diameter of the lower engagement section 62 is small in comparison with the other portion of the positioning column 60b. As described later, the lower jig 52 and the upper jig 54 are coupled together through this lower engagement section 62. It is a matter of course that a positioning column inserted into the third through hole 32 may be provided for the lower jig 52.

The upper jig 54 includes a base panel 66 supported by an arm 64 of a transportation robot (not shown), and a plurality of holders protruding from a lower surface of the base panel 66. In FIG. 3, among these holders, four holders 68a to 68d are shown. Further, the upper jig 54 has a coupling section 70 facing the positioning column 60b, and an upper engagement section 72 as a bottomed hole is provided at a position of the coupling section 70 corresponding to the lower engagement section 62.

Further, the vehicle body assembling apparatus 50 includes a welding robot (welding device) not shown. A welding gun is provided for an arm of the welding robot. The arm is operated suitably to move the welding gun to a position where welding operation needs to be performed.

The vehicle body assembling apparatus 50 according to the embodiment of the present invention basically has the above structure. Next, effects and advantages of the vehicle body assembling apparatus 50 will be described in relation to a method of assembling a vehicle body according the embodiment of the present invention.

In order to assemble the rear floor component 10, a temporary assembly 12A (lower component part) of the rear floor frame 12 is transported. As shown in FIG. 3, this transportation is performed by the upper jig 54. That is, mainly, the holder 68a holds and positions the first cross member 20, and the holder 68b holds and positions the second cross member 22. Therefore, the upper jig 54 is held by the temporary assembly 12A. As can be understood from the above, the holders 68a, 68b function as the lower component part positioning units for positioning the temporary assembly 12A. It should be noted that the holder 68d passes through the second opening 28.

In this state, the arm 64 of the transportation robot is operated suitably to perform the step of positioning the lower component parts. That is, the arm 64 moves the upper jig 54 and the temporary assembly 12A onto the lower jig 52, altogether. The coupling section 70 is positioned above the fourth through holes 34.

Figure 4:
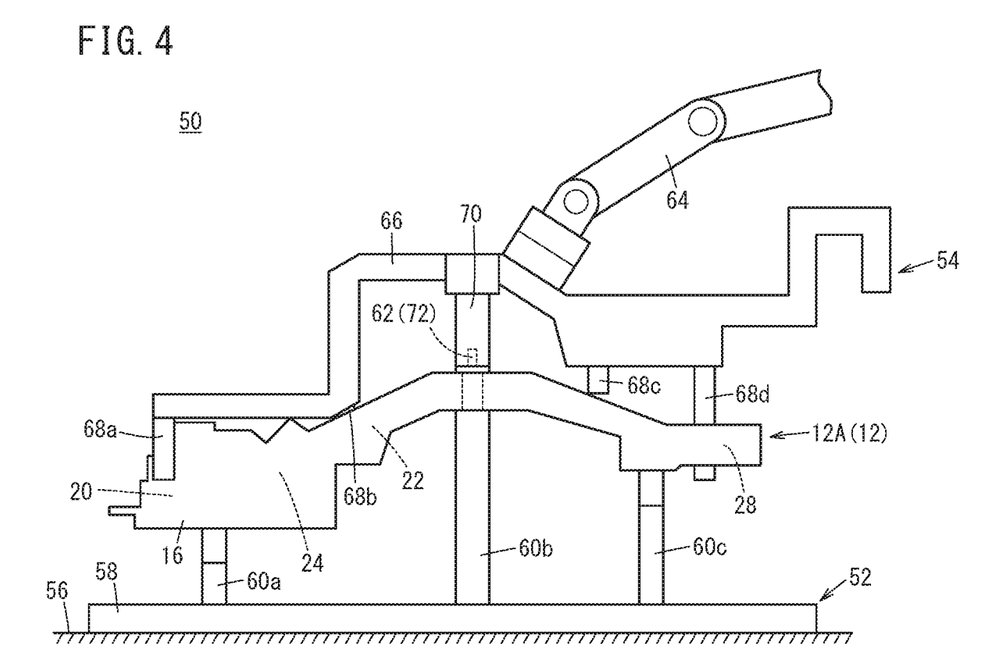
FIG. 4 is a side view schematically showing main components in a state where the rear floor frame is positioned by a lower jig of the vehicle body assembling apparatus in FIG. 3.

Thereafter, the arm 64 continues its operation to lower the upper jig 54 toward the lower jig 52. As a result, as shown in FIG. 4, the temporary assembly 12A is supported by the positioning columns 60a to 60c. At this time, the front end of the positioning column 60a is inserted into the first through hole 26. Likewise, the front end of the positioning column 60c is inserted into the second through hole 30. As a result, the temporary assembly 12A is positioned.

It should be noted that the lower engagement section 62 provided at the forefront end of the positioning column 60b protrudes from the fourth through hole 34. This lower engagement section 62 is inserted into the upper engagement section 72 of the coupling section 70 positioned above the fourth through hole 34. In the structure, the lower engagement section 62 and the upper engagement section 72 are brought into engagement with each other. As a result, the lower jig 52 and the upper jig 54 are coupled together. Therefore, the lower jig 52 and the upper jig 54 are brought into alignment with each other accurately. As a result, the temporary assembly 12A is positioned accurately.

Next, in the lower joining step, welding is applied to the temporary assembly 12A. That is, the arm of the welding robot is suitably operated to move the welding gun to and from any of the contact position between the first side member 16 and the first cross member 20, the contact position between the first side member 16 and the second cross member 22, the contact position between the second side member 18 and the second cross member 22, and the contact position between the second side member 18 and the first cross member 20 in an arbitrary order, and weld each of the contact positions. As a result, the rear floor frame 12 as the lower assembly is obtained.

Next, the upper joining step is performed. For this purpose, the arm 64 of the transportation robot is operated. As a result, the upper jig 54 is detached from the rear floor frame 12. Next, the transportation robot holds a temporary assembly 14A (upper component parts) of the rear floor panel 14 stored in a stock yard by the upper jig 54, and as shown in FIG. 5, the transportation robot is operated such that the temporary assembly 14A is positioned above the rear floor frame 12. At this time, the holders 68b, 68d hold the first cover 40 and the second cover 44, respectively, and the coupling section 70 is inserted into the large through hole 43 of the curved section 42.

In this state, the temporary assembly 14A is welded. That is, the arm of the welding robot is operated suitably, and welding gun moves to and from any of the contact position between the first cover 40 and the curved section 42, and the contact position between the curved section 42 and the second cover 44 in an arbitrary order, and welds each of the contact positions. As a result, the rear floor panel 14 as the upper assembly is obtained.

Additional welding may be applied to the temporary assembly 12A (lower component parts) or the rear floor frame 12 (lower assembly) during a period from the end of the lower joining step to the start of the upper joining step, i.e., from the time the arm 64 of the transportation robot is operated to hold the temporary assembly 14A (upper component parts) until the time the arm 64 of the transportation robot transports the temporary assembly 14A to the position for performing the upper joining step.

Further, also in the middle of the upper joining step, if there is any idle or inactive joining device such as the welding robot which is not engaged in working operation, additional joining may be performed for the temporary assembly 12A (lower component parts) or the rear floor frame 12 (lower assembly) by the joining device.

Figure 6:
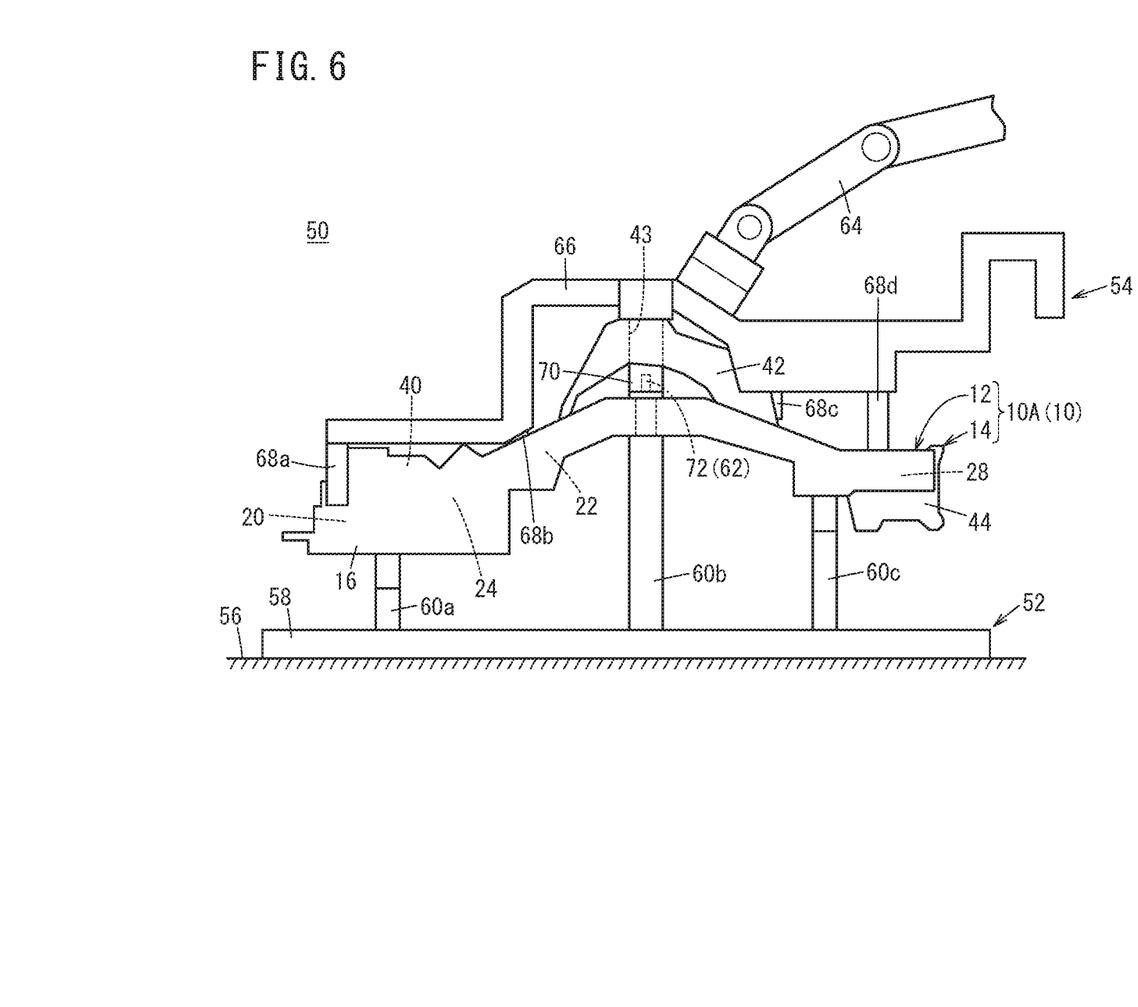
FIG. 6 is a side view schematically showing main components in a state where the rear floor panel is overlapped with the rear floor frame on the lower jig to from a rear floor component.

Thereafter, the vertical positioning step is performed. That is, the arm 64 continues its operation to lower the upper jig 54 toward the lower jig 52. Since the rear floor frame 12 remains held by the positioning columns 60a to 60c, as shown in FIG. 6, the rear floor panel 14 is overlapped on the rear floor frame 12, and a temporary assembly 10A of the rear floor component 10 is formed. At this time, the first opening 24 is covered by the first cover 40, and the second opening 28 is covered by the second cover 44. Further, at this position, the curved section 42 bridges the second cross member 22.

The lower engagement section 62 provided at the forefront end of the positioning column 60b protrudes from the fourth through hole 34. Therefore, also at the time of this overlapping, the lower engagement section 62 enters the upper engagement section 72. That is, the lower engagement section 62 and the upper engagement section 72 are engaged with each other, and the lower jig 52 and the upper jig 54 are coupled together.

As a result of this coupling, displacement between the relative positions of the lower jig 52 and the upper jig 54 does not occur easily. That is, the relative positions of the lower jig 52 and the upper jig 54 can be maintained accurately. Thus, the rear floor frame 12 and the rear floor panel 14 are overlapped, and positioned with each other accurately.

Next, the vertical joining step is performed. At this time, the welding robot suitably operates the arm to perform welding of the rear floor frame 12 and the rear floor panel 14. As a result, the rear floor frame 12 and the rear front panel 14 are joined together, and a rear floor component 10 as the vertical assembly is obtained.

Thereafter, the upper jig 54 may be used to transport the rear floor component 10 from the lower jig 52 to the outside, or after the upper jig 54 is detached from the rear floor component 10, the rear floor component 10 may be transported from the lower jig 52 to the outside by another transportation robot. In the latter case, the upper jig 54 detached from the rear floor component 10 may be used to hold the rear floor frame 12 on which next welding is performed subsequently.

As described above, in the embodiment of the present invention, the temporary assembly 12A of the rear floor frame 12 and the temporary assembly 10A of the rear floor component 10 are welded at the same position (on the lower jig 52). Further, the temporary assembly 14A of the rear floor panel 14 is welded above the rear floor frame 12 positioned at the lower jig 52. Therefore, no dedicated space is required for performing welding operation to obtain each of the rear floor frame 12, the rear floor panel 14, and the rear floor component 10 individually. Thus, it is possible to reduce the size, or achieve space saving of the vehicle body assembling apparatus 50.

Further, the temporary assembly 12A, the temporary assembly 14A, and the temporary assembly 10A are welded, i.e., welding operation for obtaining the rear floor frame 12, the rear floor panel 14, and the rear floor component 10 are performed at different timings. Therefore, it is sufficient to use only one welding robot. That is, there is no need to use more than one welding robot. This point contributes to space saving of the vehicle body assembling apparatus 50 as well. Additionally, since the number of welding robots is reduced, it is possible to achieve reduction in the capital investment.

Further, the rear floor panel 14 is welded to the temporary assembly 14A above the rear floor frame 12 positioned at the lower jig 52. Therefore, after the rear floor frame 12 is obtained, it is possible to immediately overlap the rear floor frame 12 with the rear floor panel 14, and immediately weld the temporary assembly 10A of the rear floor component 10 formed by overlapping. Therefore, it is possible to produce the rear floor component 10 efficiently.

The first side member 16 and the second side member 18 have substantially the same shape regardless of the vehicle model. In contrast, the first cross member 20 and the second cross member 22 may have different shapes depending on the vehicle model. For the reasons as described above, at the time of positioning the temporary assembly 12A or the rear floor frame 12 by the lower jig 52, preferably, as described above, the positioning columns 60a, 60c are inserted into the first through hole 26 and the second through hole 30 formed in the first side member 16 and the second side member 18 for positioning the temporary assembly 12A or the rear floor frame 12. In this manner, even in the case of producing the rear floor components 10 of different vehicle models, i.e., even in the case where shapes of the first cross member 20 and the second cross member 22 may change depending on the vehicle model, it is possible to use the same lower jig 52. That is, improvement in the versatility of the lower jig 52 is achieved.

Further, since the lower jig 52 may have any structure as long as the lower jig can position the first side member 16 and the second side member 18, it is possible to simplify the lower jig 52.

The shape of the rear floor panel 14 may change depending on the vehicle model. Therefore, the upper jig 54 holding the temporary assembly 14A or the rear floor panel 14 should be replaced depending on the vehicle model. In this regard, as described above, the shapes of the first cross member 20 and the second cross member 22 may change depending on the vehicle model. Therefore, preferably, the upper jig 54 is configured to hold the first cross member 20 and the second cross member 22 of the rear floor frame 12 as well as the rear floor panel 14. In this manner, in the case of producing the rear floor component 10 of a new vehicle model which is different from the previous vehicle model, by replacing the upper jig 54, it becomes possible to hold both of the rear floor panel 14 and the rear floor frame 12 (temporary assemblies 12A, 14A). Thus, it is possible to achieve reduction in the capital investment to a greater extent.

It should be noted that the first side member 16 and the second side member 18 can be positioned accurately by the lower jig 52 as described above. Therefore, at the time of holding the first cross member 20 and the second cross member 22 by the upper jig 54, the upper jig 54 may hold the first side member 16 and the second side member 18 loosely.

The present invention is not limited specially to the above described embodiment, and various changes may be made without deviating from the gist of the present invention.

For example, the lower assembly, the upper assembly, and the vertical assembly are not limited to the rear floor frame 12, the rear floor panel 14, and the rear floor component 10 as described above. The lower assembly, the upper assembly, and the vertical assembly may be assemblies of other types.

Further, it is a matter of course that the lower jig 52 may be configured to be replaceable.

Further, in the above embodiment, after the rear floor frame 12 is formed, the temporary assembly 14A is welded to form the rear floor panel 14. Alternatively, after the rear floor panel 14 is formed by welding the temporary assembly 14A, the temporary assembly 12A on the lower jig 52 may be welded to form the rear floor frame 12. In this case, the temporary assembly 14A (upper component parts) is welded on the temporary assembly 12A made up of the lower component parts.

Furthermore, the method of joining the component parts is not limited to welding.

In the embodiment of the present invention, the upper jig 54 includes the single upper engagement section 72 for the lower engagement section 62. Alternatively, two upper engagement sections 72 may be provided at positions which are offset from each other in the vertical direction, in the traveling direction, or in the lateral direction, and the two upper engagement sections 72 may be used selectively for the lower joining step and the vertical joining step.

Though the upper jig 54 is used to position two types of parts having different shapes, i.e., the lower component part and the upper component part, the upper jig 54 is transported by the arm 64 of the transportation robot. Thus, there is a demand to reduce the size of the upper jig 54 as much as possible. As described above, by providing the two types of the upper engagement sections 72, it is possible to ensure that the lower jig 52 and the upper jig 54 are relatively positioned with each other accurately in the lower joining step and the vertical joining step. Further, using the upper jig 54 having a small size capable of holding both of the lower component parts and the upper component parts easily, it is possible to improve the freedom in the design of the upper jig 54.

It should be noted that instead of providing the two upper engagement sections 72, the position of a single upper engagement section 72 may be changed selectively by an actuator, etc. Also in this case, the same advantages are obtained. Further, instead of providing the two upper engagement sections 72, two lower engagement sections 62 may be provided, or the position of the lower engagement section 62 may be changed selectively by an actuator, etc. as described above.

What is claimed is:

1. A method of producing a vehicle body assembly, for assembling a vertical assembly as a component part of a vehicle body, by overlapping an upper assembly formed by joining two or more upper component parts together, above a lower assembly formed by joining two or more lower component parts together, and joining the upper assembly and the lower assembly together, the method comprising the steps of:

positioning the lower component parts by operating an arm of a robot to move an upper jig supported by the arm so as to transfer the two or more lower component parts held by the upper jig to a lower jig, and positioning the lower component parts by the lower jig;

performing lower joining operation by joining the lower component parts positioned by the lower jig, using a joining device to form the lower assembly;

performing upper joining operation by joining the upper component parts positioned by the upper jig, using the joining device to form the upper assembly, above the lower component parts or the lower assembly positioned by the lower jig;

performing vertical positioning operation by operating the arm to move the upper jig so as to overlap the upper assembly above the lower assembly, and position the upper assembly relative to the lower assembly; and performing vertical joining operation by joining the lower assembly and the upper assembly together using the joining device to form the vertical assembly.

2. The production method according to claim 1, wherein the lower jig includes a lower engagement section, and the upper jig includes an upper engagement section configured to engage with the lower engagement section, and a lower component part positioning section configured to position a portion of the lower component parts; and in the step of performing the lower joining operation, the lower component parts are positioned by the lower component part positioning section, and the lower engagement section and the upper engagement section are brought into engagement with each other.

3. The production method according to claim 2, wherein, in the step of performing the vertical joining operation, the lower engagement section and the upper engagement section are brought into engagement with each other.

4. The production method according to claim 1, wherein the obtained vertical assembly is transported to outside by the upper jig.

5. The production method according to claim 1, wherein a rear floor frame, a rear floor panel, and a rear floor component are obtained as the lower assembly, the upper assembly, and the vertical assembly, respectively.

* * * * *